United States Patent Office 3,442,176
Patented May 6, 1969

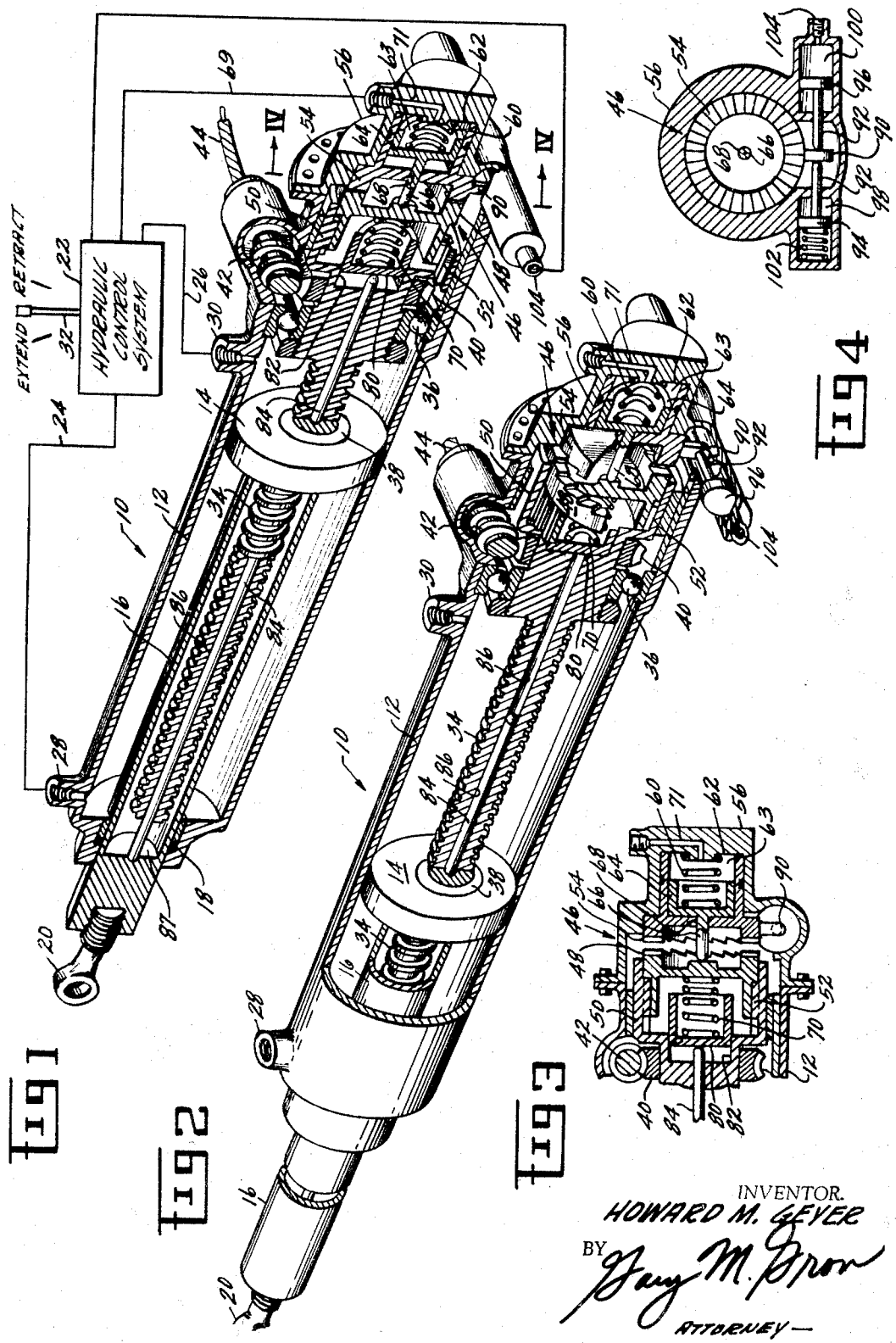

3,442,176
ACTUATOR LOCKING MECHANISM
Howard M. Geyer, Dayton, Ohio, assignor to General Electric Company, a corporation of New York
Filed May 1, 1967, Ser. No. 635,018
Int. Cl. F15b 15/26
U.S. Cl. 91—44
14 Claims

ABSTRACT OF THE DISCLOSURE

The disclosure shows an actuator comprising a cylinder and a piston displaceable therein to extend and retract a piston rod. A rotatable screw shaft is journaled in the cylinder to cooperate with an acme nut in the actuator piston for synchronizing the displacement of the piston rod with piston rods of a plurality of actuators through a suitable mechanical interconnection. A locking mechanism, provided for the piston and piston rod, comprises a circular ratchet plate mounted in the actuator chamber and a circular ratchet plate mounted on and rotatable with the screw shaft, but displaceable towards ratchet plate. A pair of springs act on the ratchet plate to automatically engage the ratchet plates when the actuator piston rod is almost to a completely retracted position to lock the piston rod securely in that position. Through a hydraulic piston arrangement, the force of the spring urging the ratchet plates into engagement is overcome and the plate separated to permit displacement of the piston. Once the piston rod is extended beyond a point closely adjacent the end of the cylinder, the spring holds the ratchet plates apart thereby preventing inadvertent engagement of the ratchet plates to lock the movement of the pistons while the piston rod is being extended.

---

The present invention relates to actuators and more specifically to actuators which incorporate a locking mechanism.

Hydraulic actuators have achieved wide utilization in aircraft for positioning elements or members. One of the unique requirements of this type of use is that frequently the actuator must be locked in one or more positions and securely locked in that position regardless of an inadvertent hydraulic pressure leak or inadvertent actuation of a control valve used to activate the actuator. An example of such a requirement may be found in the actuators used for thrust reversers on an aircraft turbojet engine. Briefly, the actuators position a series of pivotally mounted flaps between a stowed position in which the engine exhaust gases are discharged in a direction giving forward thrust and an extended position in which the hot gases from the engine are deflected to produce a reverse thrust.

The application of actuators for thrust reverser actuation generally encompasses two main requirements. The first of the requirements is that the actuators be securely locked when the thrust reverser flaps are in their fully stowed position to prevent any disturbance to the normal air flow of the aircraft and to prevent inadvertent pressurization of the actuator to extend the flaps while aircraft is in flight. The second requirement is that when the thrust reverser flaps are purposely being extended to the reverse thrust position, the actuator locking mechanism must not be engaged. Engagement of the lock during this mode of operation would in some cases cause serious damage to the thrust reverser mechanism owing to the generally rapid speed with which the flaps are pivoted.

Accordingly, it is an object of the present invention to provide an actuator which is only locked near the extremities of its travel.

The above objects are achieved by providing an actuator comprising a chamber and a piston displaceable between opposite ends of the chamber. First and second brake means engageable with one another are provided for locking the piston against movement. Means are provided for maintaining the brake means out of engagement for piston displacement between a given point adjacent one end of the chamber and the opposite end thereof. Means are also responsive to movement of the piston beyond a given point towards the first mentioned chamber and are provided for urging the brake means into engagement. Means are provided for selectively disengaging the brake means when the piston is between the given point in the first mentioned chamber to permit displacement of the piston to the opposite end of the chamber. As a result, the brake means are only engaged when the piston is between a given point in the end of the chamber and the brake means are maintained out of engagement for movement beyond the given point.

The above and other related objects and features of the present invention will be apparent from a reading of the description of the disclosure shown in the accompanying drawings and the novelty thereof pointed out in the appended claims.

In the drawings:
FIGURE 1 is a perspective view of an actuator embodying the locking mechanism of the present invention together with the associated control components needed for operation.

FIGURE 2 is a perspective view of the locking mechanism incorporated in the actuator of FIGURE 1, shown in a disengaged position.

FIGURE 3 is a partial longitudinal view of the actuator locking mechanism of FIGURE 3 shown in another disengaged position.

FIGURE 4 is a view taken on line IV—IV of FIGURE 1.

Reference is had to FIGURE 1 which illustrates an actuator 10 comprising a cylinder 12 and a piston 14 displaceable between opposite ends of the cylinder 12. A generally tubular piston rod 16 extends from the piston 14 through a suitably sealed opening 18 in one end of the cylinder. An eyebolt 20 is secured in the end of the piston rod 16 for attachment to a device desired to be positioned by the actuator 10. The piston 14 is displaced to extend or retract the piston rod 16 by means of fluid pressures on opposite sides from a hydraulic control systhem 22 via conduits 24 and 26, and through fittings 28 and 30, respectively. Pressurized fluid is directed by the hydraulic control system 22 to the cylinder 12 in response to inputs from an operator control lever 32 which is moveable between an extended and a retracted position.

It is generally common practice to utilize a plurality of actuators to move an element and as a result, it is desirable to synchronize movement of each of the actuators with the others. For this purpose, a screw shaft 34 is journaled in the chamber cylinder 12 by means of a thrust bearing 36 and engages an acme nut 38 mounted in the piston 14. The acme nut 38 causes the screw shaft 34 to rotate counterclockwise as viewed towards its journaled end, in response to retracting the piston rod 16. A worm wheel 40 secured to the screw shaft 34 cooperates with a worm gear 42 to rotate the worm gear 42 in response to linear displacement of the piston 14. The worm gear 42 is connected to corresponding worm gears on another actuator by means of a flexible shaft 44 so that the movements of the individual actuators are synchronized. In order to lock the piston 14 against movement when the piston rod is retracted, in accordance with the present invention, locking mechanism generally indicated by reference number 46 is provided.

The locking mechanism 46 comprises a first circular ratchet plate 48 positioned in an expanded portion 50 of the screw shaft 34 by splines 52 which allow axial displacement of the ratchet wheel 48 into engagement with a second ratchet wheel 54, mounted in an end cap 56 of the cylinder 12. The teeth of the ratchet plates 48, 54 are arranged so that when they are engaged, plate 48 may only rotate in a counterclockwise direction, as viewed towards plate 54, which permits the piston rod 16 to retract. The ratchet plate 48 is yieldingly urged away from the ratchet plate 54 by means of a spring 60, which has a given spring rate, against an end wall 62 of a chamber 63 in the cap 56 and the face of a piston 64. The piston 64 has a rod 66 extending therefrom through an opening 68 in the ratchet plate 54 to contact the face of the ratchet plate 48. The ratchet plate 48 is also displaceable away from plate 54 through the selective pressurization of chamber 63 by the hydraulic control system 22 via a conduit 69 and passageway 71 as will be described later. A spring 70 having a spring rate higher than that of the spring 60 abuts the opposite face of the ratchet plate 48 and a piston 80, which is displaceable in a bore 82 in the screw shaft 34. An elongated rod 84 extends through a longitudinal passageway 86 in the screw shaft 34 and abuts an end wall 87 of the tubular piston rod 16 and the piston 80 when the rod 16 is a predetermined distance from its full retracted position.

The ratchet plate 54, while restrained from linear movement by suitable means (not shown), is rotatable through a portion of a turn. A tab 90, shown in detail in FIGURE 4, extends radially from the plate 54 between arms 92 which project from a pair of displaceable pistons 94, 96 in chambers 98, 100, respectively. A spring 102 acts on piston 94 to rotate the ratchet plate 54 in a clockwise direction as viewed towards its face. The chamber 100 is selectively pressurized, through a conduit 104, by the control system 22 to rotate the ratchet plate 54 in an opposite direction.

The operation of the actuator locking mechanism 46 will be discussed with reference to FIGURE 1 and with reference to FIGURES 2 and 3 in which conduits for the hydraulic fluid have been omitted for ease of understanding. Referring specifically to FIGURE 2, the actuator piston rod is substantially spaced from and traveling towards its fully retracted position in response to movement of the operator lever 32 (FIGURE 1) to the retract position. In this condition, the rod 84 is not forced towards the piston 80 by the end wall 87 of the piston rod 16, thus allowing the spring 60 to urge the ratchet plate 48 away from ratchet plate 54. Although the action of the spring 60 is opposed by spring 70 which has a higher spring rate or force level, the fact that the rod 84 is loose permits the piston to rest against the end wall of the bore 82 and allow sufficient clearance to have the ratchet plate 48 disengage when the spring 70 is almost in its free height position. Thus, the ratchet plates are positively maintained out of engagement by the spring 60 during displacement of the piston rod in an extended position.

As the piston rod 16 retracts, the end wall 87 thereof urges the rod 84 against piston 80, as shown in FIGURE 1, when the piston rod 16 is a predetermined relatively short distance from its fully retracted position. Further movement in a retracted direction causes the piston 80 to urge spring 70 against ratchet plate 48. Since the spring rate of spring 70 is higher than that of spring 60, the force exerted by spring 70 overcomes the action of spring 60 and urges plates 48 and 54 into engagement. With the plates 48 and 54 in engagement, the piston rod 16 may continue to retract until the device powered by the actuator 10 is in a fully retracted position as in the case of thrust reverser flaps. However, any movement in an extended position is prevented by the one way action of the ratchet plates.

Once the piston rod is fully retracted, it is generally desirable to hold the rod in that position with a positive force. Because of the spacing of the ratchet plate teeth, the plates may not always come to rest with the base of one tooth contacting the other. In addition, it is desirable to alleviate limited movement of the actuator piston rod while preventing substantial movement. When the actuator piston rod is being displaced, the chamber 100 is pressurized to place the ratchet plate 54 in its clockwise position against the action of spring 102. When the piston rod 16 has come to rest, the hydraulic control system depressurizes conduit 104 to permit spring 102 to rotate plate 54 in a counterclockwise direction. This rotation allows the base of the ratchet teeth to abut one another and allows the ratchet plate 54 to rotate the plate 48. The ratchet plate 48 is rotated in a direction to further retract the rod 16 with a positive force.

When it is desired to extend the piston rod 16, the control lever 32 is moved to the extend position. The hydraulic control system first pressurizes conduit 104 to enable rotation of plate 54 to relieve the holding force on the plates. The hydraulic control system then pressurizes chamber 63 to displace piston 64 which urges ratchet plate 48 away from plate 54 against the action of spring 70, as shown in FIGURE 3. After the plates 48, 54 are disengaged to permit movement, the hydraulic control system 22 then pressurizes conduit 30 to a higher level than conduit 28 to cause the piston rod 16 to extend. As the piston rod extends, the rod 84 moves away from the piston 80 and permits it to bottom in the bore 82. At this point, the chamber 63 is depressurized because the action of the spring 60 will automatically hold the ratchet plates apart.

It is apparent from the foregoing that the locking mechanism described enables an extremely positive and safe means of locking an actuator. It should be particularly noted that the locking mechanism 46 is positively disengaged for all portions of piston rod travel except the very last portion of its stroke by the spring 60. Furthermore, the input which automatically engages the ratchet plates is derived directly from the piston rod movement through rod 84 rather than from a remote source. This enables a high degree of safety and assurance that the locking mechanism 46 will not be inadvertently engaged while the piston rod is being displaced.

Additional benefits are derived from the fact that a sequencing of events must occur before the actuator piston rod is extended. This sequencing enables greater utilization of safety devices to prevent inadvertent actuation when the actuator should be locked as in the case of a stowed thrust reverser mechanism.

While a preferred embodiment of the present invention has been described, it is apparent that modifications thereof may be made by those skilled in the art without departing from the spirit of the invention. Accordingly, the scope of the invention is to be limited solely by the following claims.

Having thus described the invention what is claimed as novel and desired to be secured by Letters Patent of the United States is:

1. An actuator comprising,
  a chamber,
  a piston displaceable between extreme positions at opposite ends of said chamber,
  means for unidirectionally locking said piston against movement in one direction of travel,
  means for automatically actuating said locking means when the piston is moving in the opposite direction during the last small increment of travel towards one of its extreme positions, and
  means for selectively disengaging said locking means to permit displacement of said piston in said one direction.

2. An actuator as in claim 1 wherein,
  said locking means includes brake elements and resilient means providing a first force for maintaining said brake elements out of engagement during displacement of said piston outside of said final increment of travel, and means carried by said piston for overcoming said resilient means and first force to engage said braking means and actuate said locking means within said final increment of travel.

3. An actuator as in claim 2 wherein, the locking means further includes a screw shaft, journaled at one end of said chamber, which is rotated by displacement of said piston, said first brake element is mounted on said screw shaft in fixed, angular relation and for axial displacement relative thereto, said second brake element being mounted in opposed relation to said first brake element, the means carried by said piston comprises a rod which displaces said first brake element axially towards said second brake element, overcoming, resilient means and automatically actuating said locking means.

4. An actuator as in claim 3 wherein, there is a resilient connection between said rod and said first brake element providing an engaging force greater than said first separating force and further wherein, the selective means include means for overcoming said engaging force and separating said brake elements, thereby permitting rotation of said screw shaft and displacement of said piston.

5. An actuator as in claim 3 wherein, said actuator further comprises, a generally tubular piston rod extending from said piston through the end of said chamber opposite the end in which said screw shaft is journaled, said piston rod having an end wall toward which said screw shaft extends through the interior of said piston rod as the piston rod is retracted into said chamber, said resilient means being spring means for providing a separating force acts against said chamber and against one face of said first brake means to urge said first brake element away from said second brake element, said screw shaft has a longitudinal passageway means extending therethrough, said rod extends through said passageway means from said tubular piston rod, a spring element between said rod and first brake element, the length of said rod being selected so that as the piston rod is retracted, the end wall thereof urges the rod and said spring element to urge the first brake element into engagement with said second brake element in said final increment of piston travel.

6. An actuator as in claim 5 wherein said selective disengaging means comprises, a first piston means displaceable in response to pressurization thereof for urging said first brake means away from said second brake means against the action of said second spring element.

7. An actuator as in claim 6 wherein said second brake element comprises a second circular ratchet plate, said first brake element comprises a first circular ratchet plate splined in the journaled end of said screw shaft and displaceable towards said second ratchet plate, the teeth of said ratchet plates being positioned so that when the ratchet plates are engaged, movement of the piston rod in a retracted direction is permitted.

8. An actuator as in claim 7 wherein said second ratcheted plate is rotatable, said actuator further comprises means for selectively rotating said second plate in a direction to rotate said first plate when said piston is fully retracted and said plates are engaged, whereby the piston rod is held in a retracted position with a positive force.

9. An actuator as in claim 8 wherein said selective rotating means comprises, a radial arm extending from said second ratchet plate, spring means positioned to pivot said arm and said second plate in a direction to rotate said first plate and lock said piston rod with a positive force, second piston means displaceable in response to pressurization for urging said arm in an opposite direction to relieve said locking force.

10. An actuator as in claim 9 in combination with means for selectively pressurizing opposite ends of said piston chamber for displacing said piston rod between an extended and retracted position, means for sequentially pressurizing said second piston means and said first piston means before said selective pressurization means causes said piston rod to be extended, whereby the ratchet plates are disengaged before said piston rod is extended.

11. An actuator comprising, a cylinder, a piston displaceable therein between extreme positions at opposite ends thereof, and means for selectively locking said piston in a given position, said locking means including resilient means continually urging said piston toward said given position while permitting limited movement to prevent undue stresses on said actuator or mechanism controlled thereby.

12. An actuator as in claim 11 wherein, the locking means comprise a screw shaft rotatable in response to displacement of said piston and means for resiliently holding said screw shaft in a position preventing displacement of said piston from said given position.

13. An actuator as in claim 12 wherein, said given position is one extreme position of the piston.

14. An actuator as in claim 13 wherein, the locking means comprise a pair of brake elements, one of which is mounted on said screw shaft and the other of which is mounted adjacent one end of said cylinder, means for bringing said elements into engagement during the final increment of travel of said piston towards said one extreme position, whereby relative angular movement between said brake elements is prevented and resilient means is effective on said second brake element to rotate it in a direction urging said piston toward said one extreme position.

References Cited

UNITED STATES PATENTS

| 2,886,008 | 5/1959 | Geyer et al. | 91—45 |
| 3,238,847 | 3/1966 | Moore et al. | 91—41 |

JAMES W. WESTHAVER, *Primary Examiner.*

U.S. Cl. X.R.

91—45